Figure 1:
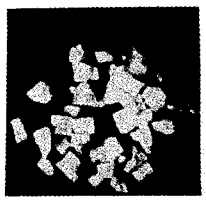

May 12, 1959  C. J. KREMER  2,886,542
RESINS
Filed Oct. 6, 1954

CHARLES J. KREMER
INVENTOR.

ATTEST:

John D. Peterson

BY Norbert E. Birch

ATTORNEY

United States Patent Office 2,886,542
Patented May 12, 1959

2,886,542
RESINS

Charles Julius Kremer, Ridley Park, Pa., assignor to The Atlantic Refining Company, Philadelphia, Pa., a corporation of Pennsylvania Application October 6, 1954, Serial No. 460,568

4 Claims. (Cl. 260—17.3)

The present invention relates to a process for the manufacture of resinous condensation products and to a new class of such products comprising the condensates formed by reacting formaldehyde with certain adducts (complexes) of ureau or thiourea. More particularly this invention relates to a process for the manufacture of resinous condensation products which closely resemble internally modified urea formaldehyde resins and to a new class of such products comprising the condensates formed by reacting formaldehyde with relatively long chain hydrocarbon adducts (complexes) of urea or thiourea.

Urea formaldehyde resins in the last decade have advanced to an established position in the plastic-molding, -laminating, -coating, and the adhesive fields. In plastics, urea formaldehyde resins are valuable supplements to the phenol formaldehyde resins, particularly where light colors and pastel shades are required. The rapid cure obtained at ordinary temperatures has resulted in many uses as castings and adhesives. The alcohol-soluble urea resins impart an unusual hardness to baked finishes, where they are used to reinforce other resins. Compounds isolated from urea and formaldehyde resins in intermediate stages of condensation are all of low molecular weight, usually under 1000. It appears that the structure in urea formaldehyde resins is highly branched (tridimensional) and it further appears that long linear molecules, which later become infusible with a slight degree of branching, are not formed. Instead, small molecules, which are potential cross-linking units, and a highly branched structure during curing are formed.

The reaction of urea and formaldehyde is sensitive to the acidity or alkalinity of the medium in which the reaction occurs. Commercial formaldehyde is usually acid. This acidity is usually higher than is desired and generally must be at least partially neutralized. Thiourea condenses with formaldehyde under much the same conditions as urea. Conditions of condensation vary somewhat with the method of application of the resins. For molding powders, the ratio of formaldehyde to urea apparently has been varied through a wide range. Urea dissolves in aqueous formaldehyde with the adsorption of heat, and the mixture drops in temperature 20° F. or more, depending on the ratio of urea to formaldehyde solution. The acidity of the formaldehyde is often adjusted before addition of urea, but in some cases the pH may vary as the condensation proceeds, and further adjustment is required. The condensation is carried out at temperatures varying from about 40° C. to the boiling point and continued until the desired degree of condensation has occurred. Water may be removed at low temperatures by vacuum evaporation to keep the resins from condensing to an infusible state. In some cases, separating a dry resin and incorporating fillers on mixing rolls, as with phenolic molding resins, have been suggested. This is usually not satisfactory with urea resins, so the evaporation is stopped when a thick syrup is obtained. This syrup is usually thoroughly mixed with cellulose fibers, colors, dyes, mold lubricants, and accelerators. The mixture is then dried under controlled conditions of temperature and humidity. Urea resins are offered to the trade in the form of syrups and as dry powders. The liquid resins generally require heat to complete the polymerization resulting in hardening of the resins. If curing accelerators (acids, acid salts, metal oxides, or certain ammonium salts, etc.) are added to the syrup, they harden at ordinary temperatures.

There are, of course, innumerable variations involved in producing urea formaldehyde resins, as for example variations in the temperature, time of reaction, amounts of reactants, pH's, catalysts, etc. Many of these various methods of producing urea formaldehyde resins are known and described in the patented literature. However, every urea formaldehyde manufacturer has his own particular trade secrets which are jealously guarded.

A number of the uses for urea formaldehyde resins require that the resins have a certain shock and break resistance. For one example, within recent years the use of urea formaldehyde resins in plastic dishware has resulted in a great deal of experimentation in an effort to develop a final product which will withstand numerous severe shocks and strains. Prior art workers have heretofore attempted to solve the brittleness and breakage problem in urea formaldehyde resins by the incorporation of internal or external modifiers in these resins. The term internal modifier is used to encompass materials such as phenolic or alkyd resins which when incorporated with the urea formaldehyde resins result in a chemical reaction. External modifiers include such substances as organic and inorganic fillers (wood flour, paper pulp, mica, asbestos, glass fibers, etc.), synthetic elastomers (polystyrenes, GRS, etc.) which have no chemical reaction when incorporated with the urea formaldehyde but instead exert only a physical effect in order to improve the shock and break resistance of the urea formaldehyde resins. Alpha cellulose which proved to be the most satisfactory external modifier so far is credited with a unique position among other fillers applied. There is a definite indication of an affinity between urea resin condensates and cellulose. It is probable that between cellulose and urea resin there exists a combination explainable on the basis of secondary valence or covalence. So definite are the indications of semi-chemical combination of the recognized type or of the various reactions, resulting from covalence affinities, that many authors have given the term "ureaformaldehyde cellulosate" to the product obtained. Although these internal and external modifiers are of a certain value in particular applications, the main objection is that they are usually more expensive than the urea formaldehyde resin itself. Attempts to internally plasticize thermosetting resins with petroleum hydrocarbons have been reported in the literature but they were not successful because the hydrocarbons tended to segregate during the condensation with the result that no plasticization was effected. At present the inherent brittleness of the thermosetting resins, particularly of the urea formaldehyde resins, must also frequently be overcome by costly co-condensation or external modification with other synthetic resins or elastomers.

It is therefore an object of this invention to provide a process for the manufacture of condensation products whereby such products will closely resemble internally modified urea formaldehyde resins. It is a further object of this invention to provide a new class of condensation products by reacting formaldehyde with certain hydrocarbon adducts (complexes) of urea or thiourea.

I have found according to this invention that the inherently poor shock and break resistance of urea formaldehyde resins can be improved 3 to 10 fold by internally plasticizing the resins with hydrocarbon adducts (complexes of urea or thiourea) during condensation. Before going further, it should be noted that hydrocarbon adducts of urea and thiourea are well known in the prior art and particularly in the prior patented art. For example U.S. Patents Nos. 2,499,820, 2,518,677, 2,520,715, 2,520,716, 2,557,257, 2,569,984, 2,569,985, 2,569,986, 2,577,202, 2,578,054, 2,588,506, 2,588,602, 2,604,430, 2,606,140, 2,606,214, 2,619,501, 2,627,513, 2,632,002, 2,635,986, 2,637,681, 2,642,377, 2,642,378, 2,642,379, 2,642,421, 2,642,423, 2,642,424, 2,658,060, 2,661,317, 2,663,671, recite numerous ways in which one may react various hydrocarbons with urea or thiourea or a mixture thereof to form an adduct. Therefore, for the sake of brevity, all of the ways in which such an adduct may be formed will not be repeated here since it is obvious that one may obtain this information in complete detail from the above patents.

It can be said in summary, however, that an adduct of a particular hydrocarbon and urea or thiourea is very simply formed by first dissolving the urea or thiourea in a solvent therefor and thereafter contacting the urea dissolved in the solvent with the hydrocarbon with which it is desired to form an aduct. Probably the most commonly used urea solvent is methyl alcohol. After the adduct has been formed, it is separated from that portion of the hydrocarbon which did not react with the urea and thereafter the aduct is washed with a small amount of benzene to remove the methanol.

According to one embodiment of this invention, approximately three parts by weight of urea are reacted with about one part by weight of a suitable hydrocarbon. It is clear however that the particular reaction conditions employed may be varied widely in accordance with the teachings of the patents cited above. When this adduct has been separated from the organic solvents associated therewith, it is admixed with one-half to two parts of formaldehyde for each part of urea. At this point there is also added either a basic or acidic catalyst depending upon the ultimate use contemplated for the resin, as is understood by those skilled in the art. Temperatures varying between room temperature and reflux temperature (approximately 300° F.) may be employed. The reaction time usually varies between 2 hours and 24 hours. Vigorous agitation is used until the desired amount of reaction has occurred. From time to time the progress of the reaction may be checked by determining the amount of free formaldehyde remaining in the reaction mixture. When there is no longer any formaldehyde in the condensation product, the condensation is complete. At this point the resin is in an initial stage of polymerization and in what is known as the "A" stage of condensation. The resin may be maintained in this "A" condition of condensation by neutralizing the resin mixture so as to destroy any acidic or basic effects which would promote further condensation.

The following examples will more clearly explain the nature of this invention, although it is to be understood that the invention is not limited to the specific details given.

*Example I*

Two moles of 37% aqueous formaldehyde were mixed with one mole of urea. Sufficient 10% NaOH solution was added as a catalyst so that the pH of the condensation mixture was initially 10.7. The temperature was about 100° F.–103° F. and the reaction time about one hour. The color of the resulting area formaldehyde resin was white after being vacuum dried to a powder.

*Example II*

Three parts by weight of urea were dissolved in nine parts by weight of methyl alcohol and then this solution was contacted with one part by weight of cetane to form a urea-cetane adduct. The reaction temperature was approximately 90° F. and the reaction time was approximately 15 minutes. After the reaction was complete, the adduct was separated from the residual solution by filtration and the adduct so obtained washed with benzene to remove substantially all of the methyl alcohol. The washed adduct was then dried. One mole of the urea-cetane adduct (urea basis) was then contacted with two moles of 37% aqueous formaldehyde. The initial pH of the condensation mixture was 10.7; the temperature between 100° F. and 103° F.; the condensation time about 1 hour; and the final pH 7.0. The color of the resulting resin was white after being vacuum dried to a powder.

*Example III*

Three parts by weight of urea were dissolved in ten parts by weight of methyl alcohol and then reacted with one part by weight of a deoiled East Texas microcrystalline wax fraction having the following properties:

| | A.S.T.M. Distillation |
|---|---|
| A.P.I. gravity at 60° F.: 30.8 | I.B.P. at 10 m./m.: 462° F. |
| Melt. point, ° F.: 166.8 | 10% at 2 m./m.: 564° F. |
| Refractive index at 176° F.: 1.45851 | 30% at 2 m./m.: 634° F. |
| Oil percent MEK: 22.5 | 42% at 2 m./m.:[1] 672° F. |

[1] Cracked at this temperature.

This wax fraction was dissolved in three parts by weight of benzene. The reaction temperature was approximately 125° F. and the reaction time approximately 2 hours. After the solid adduct had formed it was separated from the residual mixture by filtration, the adduct so obtained was washed with benzene to remove the residual methyl alcohol and finally dried. One mole of this adduct (urea basis) was reacted with two moles of 37% aqueous formaldehyde. The initial pH of the condensation mixture was 10.7; the temperature between 100° F. and 103° F.; the reaction time about 1 hour and the final pH about 7.0. The color of the resulting resin was cream after being vacuum dried to a powder.

The resins produced in accordance with Examples I, II and III were then molded into small once inch diameter discs in accordance with the following procedure. A one inch daimeter laboratory steel pellet mold was successively filled with each of the above powders. One percent by weight of oxalic acid was added to the powder as a curing agent during the molding operation. The electric heating jacket associated with the mold was adjusted so that the temperature was maintained between about 170° F. and 190° F. during the molding operation. The molding pressure was approximately 2500 p.s.i. and the thickness of the resulting one inch diameter discs averaged about 3 mm.

The brittleness or conversely the shock and break resistance of the discs prepared from the resins of Examples I, II, and III in accordance with the molding techniques set forth in the previous paragraph, were tested by the following procedure. A one inch diameter steel ball weighing 66.8 grams was suspended over one of the above discs by means of an electromagnet. The current in the electromagnet was cut off thus allowing the steel ball to fall upon the disc. By successively increasing the distance of the steel ball above the disc one may determine the minimum height at which the steel ball will shatter the disc. This determination provides a fairly accurate measure of the relative shock and break resistance of the discs.

Figure 1 in the drawings shows the shattered condition of a disc which was prepared from the resin powder of Example I. The steel ball was dropped from only a distance of 37 mm. above the disc to cause this extensive shattering.

Figure 2:
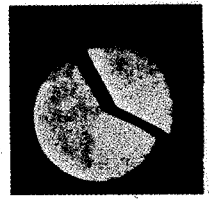

Figure 2 shows the cracked condition of a disc which was prepared from the resin powder of Example II. It should be noted, however, that this cracking of the disc was not effected until the steel ball had dropped a distance of 125 mm. In other words, the use of a urea-cetane adduct rather than urea alone in preparing the resin powder for the disc of Figure 2 resulted in a molded resin which was more than three times as good insofar as shock and break resistance is concerned.

Figure 3:
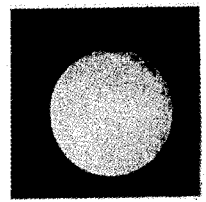

Figure 3 shows the uncracked condition of a disc which was prepared from the resin powders of Examples I and III. More specifically, 2 parts by weight of the resin powder from Example III were mixed with 1 part by weight of the resin powder from Example I, and molded into a one inch disc in accordance with the procedure outlined previously. Figure 3 represents the condition of the disc after the steel ball had been dropped from a height of 135 mm. It is thus seen that the use of a urea-wax fraction adduct in place of urea alone in preparing the resin powder for the disc in Figure 3 effected a remarkable improvement in the shock and break resistance of the molded resin.

Figure 4:
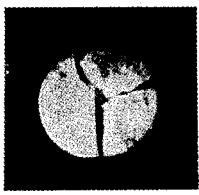
Figure 5:
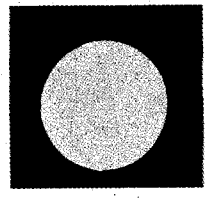
Figure 6:
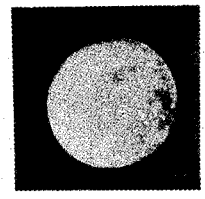

The discs shown in Figures 4, 5, and 6 were prepared from the resins of Examples I, II, and III, respectively, in accordance with the general molding procedure previously outlined—the only difference being that 5% by weight of alpha cellulose was incorporated in each of these discs. Alpha cellulose is often used by those in the plastics industry to improve the shock and break resistance of molded products. In comparing Figures 4, 5, and 6 it will be noted that the disc of Figure 4 (containing the resin of Example I) shattered into several pieces when the steel ball was dropped from a height of 162 mm.; the disc of Figure 5 (containing the resin of Example II) only contained a few surface cracks after the steel ball had been dropped from a height of 360 mm.; and the disc of Figure 6 (containing the resin of Example III) was essentially uncracked and unmarred after the steel ball had dropped from a height of 420 mm.

Thus by comparing the condition of the discs in Figures 1-6, one can readily observe that resins containing the reaction product of formaldehyde and a urea-hydrocarbon adduct is vastly superior in shock and break resistance to a urea-formaldehyde resin which does not contain such adducts.

As has been described in the abovementioned prior patented art, urea forms adducts with the normal, straight chain paraffinic and olefinic hydrocarbons and with very slightly branched chain paraffins of high molecular weight such as a molecule having twenty-five carbon atoms in the chain with but a single short branch such as a methyl or ethyl group. It has been found that urea will form adducts with hydrocarbons having from four to forty or more carbon atoms in the molecule.

Thiourea, in general, reacts with those hydrocarbons which do not form adducts with urea. For example, thiourea will form adducts with branched chain paraffins and olefins, cycloparaffins and similar compounds. The range of molecular weight of the hydrocarbons which will form adducts with thiourea is similar to the range of the molecular weight compounds which form adducts with urea.

Depending upon the properties desired in the finished resin the urea or thiourea adduct may be any of the abovementioned compounds. It appears that the adducts formed with the higher molecular weight hydrocarbons such as wax give somewhat better shock and break resistance than adducts with low molecular weight hydrocarbons.

As mentioned earlier, phenolic and alkyd resins have previously been employed as modifiers for urea-formaldehyde resins. Likewise, other amino resins and synthetic elastomers have been used to modify urea-formaldehyde resins. Consequently, it should be understood that the condensation products formed in accordance with this instant invention may in turn be employed to modify phenolic-, other amino-, or alkyd resins, and synthetic elastomers. In fact, it can be stated that hydrocarbon adducts of urea and thiourea or condensation products formed in accordance with the teachings of this invention may be employed wherever urea, thiourea, or urea-formaldehyde, thiourea-formaldehyde resins have been heretofore employed in the plastics art.

It is also known in the prior art that hydrocarbon solubility can be imparted to urea-formaldehyde resins by adding low molecular weight alphatic alcohols (methanol, butanol, etc.). Accordingly, similar properties may be imparted to the products of this invention by adding alcohol or by omitting the removal of a portion of the urea solvent after the hydrocarbon adduct has been formed.

I claim:

1. A process of preparing hydrocarbon modified urea-formaldehyde resins and thiourea-formaldehyde resins which comprises reacting a hydrocarbon having from 4 carbon atoms to 40 carbon atoms and selected from the group consisting of normal paraffins, normal olefins, isoparaffins, isoolefins, naphthenes and cycloparaffins with a compound selected from the group consisting of urea and thiourea to form the corresponding adduct from the group consisting of urea-normal paraffinic hydrocarbon, urea-normal olefinic hydrocarbon, thiourea-isoparaffinic hydrocarbon, thiourea-isoolefinic hydrocarbon, thiourea-naphthenic hydrocarbon and thiourea-cycloparaffinic hydrocarbon adducts and condensing the adduct with formaldehyde by contacting said adduct with from about 0.5 to about 2 parts of formaldehyde for each part of urea at temperatures ranging between room temperature and the reflux temperature of the adduct.

2. A resin comprising the condensation product of a hydrocarbon adduct selected from the group consisting of urea-normal paraffinic hydrocarbon, urea-normal olefinic hydrocarbon, thiourea-isoparaffinic hydrocarbon, thiourea-isoolefinic hydrocarbon, thiourea-naphthenic hydrocarbon and thiourea-cycloparaffinic hydrocarbon adducts with formaldehyde wherein the hydrocarbons forming the adducts contain from 4 to 40 carbon atoms, said condensation being performed by contacting said adduct with from about 0.5 to about 2 parts of formaldehyde for each part of urea at temperatures ranging between room temperature and the reflux temperature of the adduct.

3. A resin comprising the condensation product of a urea-normal paraffinic hydrocarbon adduct with formaldehyde wherein the normal paraffinic hydrocarbon contains from 4 to 40 carbon atoms, said condensation being performed by contacting said adduct with from about 0.5 to about 2 parts of formaldehyde for each part of urea at temperatures ranging between room temperature and the reflux temperature of the adduct.

4. A resin comprising the condensation product of a hydrocarbon adduct selected from the group consisting of urea-normal paraffinic hydrocarbon, urea-normal olefinic hydrocarbon, thiourea-isoparaffinic hydrocarbon, thiourea-isoolefinic hydrocarbon, thiourea-napthenic hydrocarbon and thiourea-cycloparaffinic hydrocarbon adducts with formaldehyde, wherein the hydrocarbons forming the adducts contain from 4 to 40 carbon atoms, said condensation being performed by contacting said adduct with from about 0.5 to about 2 parts of formaldehyde for each part of urea at temperatures ranging between room temperature and the reflux temperature of the adduct, said resin being modified by the addition of alpha cellulose.

References Cited in the file of this patent

UNITED STATES PATENTS

| 2,698,870 | Bloch et al. | Jan. 4, 1955 |

FOREIGN PATENTS

| 582,853 | Great Britain | Nov. 29, 1946 |
| 123,111 | Sweden | Oct. 26, 1948 |
| 671,457 | Great Britain | May 7, 1952 |

OTHER REFERENCES

Kobe et al.: "Extractive Crystallization, A New Separation Process," Petroleum Refiner, vol. 31, No. 3, March 1952, page 109. (Copy in 106–113.)

UNITED STATES PATENT OFFICE
CERTIFICATE OF CORRECTION

Patent No. 2,886,542                                      May 12, 1959

Charles Julius Kremer

It is hereby certified that error appears in the printed specification of the above numbered patent requiring correction and that the said Letters Patent should read as corrected below.

Column 1, line 19, for "ureau" read -- urea --; column 2, line 72, for "(complexes of urea or thiourea)" read -- (complexes) of urea or thiourea --; column 3, lines 22 and 26, for "aduct", each occurrence, read -- adduct --; line 65, for "area" read -- urea --; column 4, Example III, in the table, strike out the dotted lines as shown; same column 4, line 40, for "once" read -- one --; line 42, for "daimeter" read -- diameter --; column 6 line 6, for "alphatic" read -- aliphatic --.

Signed and sealed this 1st day of September 1959.

(SEAL)
Attest:

KARL H. AXLINE
Attesting Officer

ROBERT C. WATSON
Commissioner of Patents